United States Patent
Tseng

(10) Patent No.: US 10,416,798 B2
(45) Date of Patent: Sep. 17, 2019

(54) TOUCH DISPLAY APPARATUS

(71) Applicant: HannStar Display Corporation, Taipei (TW)

(72) Inventor: Heng-Cheng Tseng, Chiayi County (TW)

(73) Assignee: HannStar Display Corporation, Taipei (TW)

( * ) Notice: Subject to any disclaimer, the term of this patent is extended or adjusted under 35 U.S.C. 154(b) by 124 days.

(21) Appl. No.: 15/832,772

(22) Filed: Dec. 6, 2017

(65) Prior Publication Data

US 2019/0073070 A1   Mar. 7, 2019

(30) Foreign Application Priority Data

Sep. 5, 2017   (CN) .......................... 2017 1 0790745

(51) Int. Cl.
| | | |
|---|---|---|
| *G06F 3/041* | (2006.01) | |
| *G02F 1/1333* | (2006.01) | |
| *G02F 1/1335* | (2006.01) | |
| *G06F 3/044* | (2006.01) | |

(52) U.S. Cl.
CPC ........ *G06F 3/0412* (2013.01); *G02F 1/13338* (2013.01); *G02F 1/133528* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 2014/0360856 | A1* | 12/2014 | Mizumoto | .............. G06F 3/044 200/600 |
| 2015/0331526 | A1* | 11/2015 | Hashida | .................. G06F 3/044 345/174 |
| 2018/0004341 | A1* | 1/2018 | Yeh | ...................... G02F 1/13338 |

* cited by examiner

*Primary Examiner* — Ifedayo B Iluyomade
(74) *Attorney, Agent, or Firm* — JCIPRNET

(57) ABSTRACT

A touch display apparatus includes a display panel having pixel areas and touch electrodes disposed above the display panel. The pixel areas are arranged with a pixel pitch $P_{px}$ in a first direction. The touch electrodes have bending patterns arranged with a first touch electrode pitch $P_{tx}$ in the first direction. Each bending pattern includes repeating portions connected with one another. The repeating portions are arranged with a second touch electrode pitch $P_{ty}$ in a second direction intersecting the first direction. Each repeating portion has a first line segment inclined with respect to the first direction and the second direction. An angle a is included between the first line segment and the second direction, and $10° \leq \alpha \leq 45°$. The pixel pitch, the first touch electrode pitch and the second touch electrode pitch satisfy $1.5P_{px} \leq P_{tx} \leq 2P_{px}$ and $1.63P_{px} \leq 0.5P_{ty} \leq 9.94P_{px}$.

23 Claims, 5 Drawing Sheets

TOUCH DISPLAY APPARATUS

CROSS-REFERENCE TO RELATED APPLICATION

This application claims the priority benefit of China application serial no. 201710790745.6, filed on Sep. 5, 2017. The entirety of the above-mentioned patent application is hereby incorporated by reference herein and made a part of this specification.

BACKGROUND

Field of the Invention

The invention relates a touch apparatus and more particularly, to a touch display apparatus.

Description of Related Art

Touch display apparatuses may be substantially categorized into a resistive type, a capacitive type, an optical type, an acoustic type and an electromagnetic type according to touch sensing modes. With advantages such as a fast touch response time, preferable reliability and high durability, the touch display apparatuses of the capacitive type have been widely applied in electronic products. According to different structures and manufacturing methods, the touch display apparatuses of the capacitive type may further substantially categorized into two types, including an added-on type and an on-cell/in-cell type. However, despite the added-on type, the on-cell type or the in-cell type, a plurality of touch electrodes of the touch display apparatus overlap a plurality of pixel areas of a display panel. As both the touch electrodes and the pixel areas have components which are arranged periodically and overlap with each other, moire patterns easily generate on the touch display apparatus, which is unfavorable for a user to watch the touch display apparatus.

SUMMARY

The invention is directed to a touch display apparatus capable of properly suppressing generation of moire patterns.

According to an embodiment of the invention, a touch display apparatus including a display panel and a plurality of touch electrodes is provided. The display panel has a plurality of pixel areas. The pixel areas are arranged with a pixel pitch $P_{px}$ in a first direction. The touch electrodes are disposed above the display panel. Each of the touch electrodes has a plurality of bending patterns. The bending patterns of the touch electrodes are arranged with a first touch electrode pitch $P_{tx}$ in the first direction. Each of the bending patterns includes a plurality of repeating portions connected with one another. The repeating portions are arranged with a second touch electrode pitch $P_{ty}$ in a second direction intersecting the first direction. Each of the repeating portions has a first line segment inclined with respect to the first direction and the second direction. An angle $\alpha$ is included between the first line segment and the second direction, wherein $10°\leq\alpha\leq45°$. The pixel pitch $P_{px}$, the first touch electrode pitch $P_{tx}$ and the second touch electrode pitch $P_{ty}$ satisfy: $1.5P_{px}\leq P_{tx}\leq 2P_{px}$ and $1.63P_{px}\leq 0.5P_{ty}\leq 9.94P_{px}$.

In the touch display apparatus according to an embodiment of the invention, $10°\leq\alpha\leq15°$, and the pixel pitch $P_{px}$, the first touch electrode pitch $P_{tx}$ and the second touch electrode pitch $P_{ty}$ satisfy: $1.5P_{px}\leq P_{tx}\leq 2P_{px}$ and $6.51P_{px}\leq 0.5P_{ty}\leq 9.94P_{px}$.

In the touch display apparatus according to an embodiment of the invention, $15°\leq\alpha\leq20°$, and the pixel pitch $P_{px}$, the first touch electrode pitch $P_{tx}$ and the second touch electrode pitch $P_{ty}$ satisfy: $1.5P_{px}\leq P_{tx}\leq 2P_{px}$ and $4.76P_{px}\leq 0.5P_{ty}\leq 6.51P_{px}$.

In the touch display apparatus according to an embodiment of the invention, $20°\leq\alpha\leq25°$, and the pixel pitch $P_{px}$, the first touch electrode pitch $P_{tx}$ and the second touch electrode pitch $P_{ty}$ satisfy: $1.5P_{px}\leq P_{tx}\leq 2P_{px}$ and $3.68P_{px}\leq 0.5P_{ty}\leq 4.76P_{px}$.

In the touch display apparatus according to an embodiment of the invention, $25°\leq\alpha\leq30°$, and the pixel pitch $P_{px}$, the first touch electrode pitch $P_{tx}$ and the second and touch electrode pitch $P_{ty}$ satisfy: and $1.5P_{px}\leq P_{tx}\leq 2P_{px}$ and $2.94P_{px}\leq 0.5P_{ty}\leq 3.68P_{px}$.

In the touch display apparatus according to an embodiment of the invention, $30°\leq\alpha\leq35°$, and the pixel pitch $P_{px}$, the first touch electrode pitch $P_{tx}$ and the second touch electrode pitch $P_{ty}$ satisfy: $1.5P_{px}\leq P_{tx}\leq 2P_{px}$ and $2.4P_{px}\leq 0.5P_{ty}\leq 2.94P_{px}$.

In the touch display apparatus according to an embodiment of the invention, $35°\leq\alpha\leq40°$, and the pixel pitch $P_{px}$, the first touch electrode pitch $P_{tx}$ and the second touch electrode pitch $P_{ty}$ satisfy: $1.5P_{px}\leq P_{tx}\leq 2P_{px}$ and $1.97P_{px}\leq 0.5P_{ty}\leq 2.4P_{px}$.

In the touch display apparatus according to an embodiment of the invention, $40°\leq\alpha\leq45°$, and the pixel pitch $P_{px}$, the first touch electrode pitch $P_{tx}$ and the second touch electrode pitch $P_{ty}$ satisfy: $1.5P_{px}\leq P_{tx}\leq 2P_{px}$ and $1.63P_{px}\leq 0.5P_{ty}\leq 1.97P_{px}$.

In the touch display apparatus according to an embodiment of the invention, each of the bending patterns presents a profile of jagged shape.

In the touch display apparatus according to an embodiment of the invention, each of the repeating portions further has a second line segment inclined with respect to the first direction and the second direction, a direction of the second line segment is different from a direction of the first line segment.

In the touch display apparatus according to an embodiment of the invention, a length of the first line segment is the same as a length of the second line segment.

In the touch display apparatus according to an embodiment of the invention, an angle $\beta$ is included between the second line segment and the second direction, and $\beta=\alpha$.

In the touch display apparatus according to an embodiment of the invention, an angle $\beta$ is included between the second line segment and the second direction, wherein $10°\leq\beta\leq45°$.

In the touch display apparatus according to an embodiment of the invention, each of the repeating portions presents a profile of dogleg shape.

In the touch display apparatus according to an embodiment of the invention, the touch electrodes are formed on the same layer.

In the touch display apparatus according to an embodiment of the invention, the touch display apparatus further includes a protection film. The protection film covers the touch electrodes.

In the touch display apparatus according to an embodiment of the invention, a haze of the protection film is H, and $0\% \leq H \leq 50\%$.

In the touch display apparatus according to an embodiment of the invention, the display panel includes two substrates, a display medium and two polarizers. The two substrates are disposed opposite to each other. The display medium is located between the two substrates. Each of the substrates has an outer surface away from the display medium. The two polarizers are respectively disposed on the outer surfaces of the two substrates, and the protection film is one of the two polarizers.

In the touch display apparatus according to an embodiment of the invention, the display panel includes two substrates opposite to each other and a display medium located between the two substrates, each of the substrates has an outer surface away from the display medium, and the touch electrodes are directly disposed on the outer surface of one of the two substrates.

In the touch display apparatus according to an embodiment of the invention, the touch display apparatus further includes a protection substrate disposed above the display panel and having an inner surface facing the display panel, and the touch electrodes are disposed on the inner surface of the protection substrate.

In the touch display apparatus according to an embodiment of the invention, the touch display apparatus further includes a sensor substrate disposed above the display panel and having a top surface and a bottom surface, and the touch electrodes are disposed on at least one of the top surface and the bottom surface of the sensor substrate.

In the touch display apparatus according to an embodiment of the invention, a touch sensing mode of the touch display apparatus is a capacitance sensing mode.

In the touch display apparatus according to an embodiment of the invention, the display panel is a liquid crystal display panel or an organic light-emitting diode (OLED) display panel.

Based on the above, the touch display apparatus according to one of the embodiments of the invention includes the display panel having a plurality of pixel areas and the touch electrodes disposed above the display panel. The pixel areas are arranged with the pixel pitch $P_{px}$ in the first direction. The bending patterns of the touch electrodes are arranged with the first touch electrode pitch $P_{tx}$ in the first direction. Each of the bending patterns includes the repeating portions connected with one another. The repeating portions are arranged with the second touch electrode pitch $P_{ty}$ in the second direction intersecting the first direction. Each of the repeating portions has the first line segment inclined with respect to the first direction and the second direction, and the angle α is included between the first line segment and the second direction, wherein $10° \leq \alpha \leq 45°$. The pixel pitch $P_{px}$, the first touch electrode pitch $P_{tx}$ and the second touch electrode pitch $P_{ty}$ satisfy: $1.5 P_{px} \leq P_{tx} \leq 2 P_{px}$ and $1.63 P_{px} \leq 0.5 P_{ty} \leq 9.94 P_{px}$. Thereby, the generation of the moire patterns can be properly suppressed, so as to improve the quality of the touch display apparatus.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, with the description, serve to explain the principles of the invention.

DESCRIPTION OF EMBODIMENTS

Figure 1:
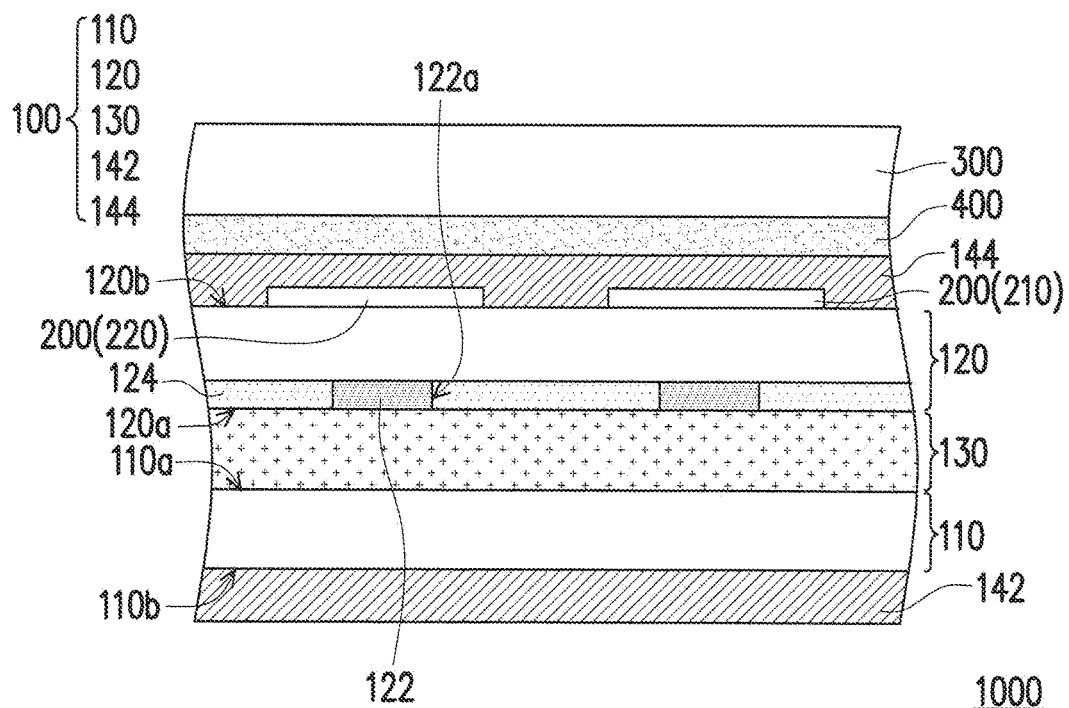
FIG. 1 is a schematic cross-sectional view showing a touch display apparatus according to an embodiment of the invention.

Reference will now be made in detail to the exemplary embodiments of the invention, examples of which are illustrated in the accompanying drawings. Wherever possible, the same reference numbers are used in the drawings and the description to refer to the same or like parts.

FIG. 1 is a schematic cross-sectional view showing a touch display apparatus according to an embodiment of the invention. Referring to FIG. 1, a touch display apparatus 1000 includes a display panel 100 and a plurality of touch electrodes 200 disposed above the display panel 100. The display panel 100 includes two substrates 110 and 120 opposite to each other and a display medium 130 located between the two substrates 110 and 120. For example, in the present embodiment, the display medium 130 may include liquid crystals, organic light-emitting diodes (OLED) or other suitable materials. The display panel 100 may be a liquid crystal display panel, an OLED display panel or other suitable display panels. In the present embodiment, the touch electrodes 200 are, for example, transparent electrodes, and a material of the transparent electrodes includes a metal nanowire (e.g., a silver nanowire) or a metal oxide (e.g., indium tin oxide, indium zinc oxide, aluminum tin oxide, aluminum zinc oxide, indium germanium zinc oxide, other suitable oxides or a stacking layer consisting of at least two of the aforementioned oxides), but the invention is not limited thereto.

In the present embodiment, the substrate 110 is, for example, a pixel array substrate. The pixel array substrate includes a plurality of active devices (not shown) and a plurality of pixel electrodes (not shown) electrically connected with the active devices. The substrate 120 is, for example, a light-shielding substrate. The light-shielding substrate includes light-shielding patterns 122. The light-shielding patterns 122 have a plurality of light-transmitting areas 122a. The light-transmitting areas 122a respectively overlap the pixel electrodes. In the present embodiment, the light-shielding patterns 122 are, for example, black matrices. The substrate 120 may selectively include a plurality of color filter patterns 124. The color filter patterns 124 are respectively disposed on the light-transmitting areas 122a of the light-shielding patterns 122. It should be mentioned that the invention is not intent to limit that the light-shielding patterns 122 have to be disposed in the substrate 120, and in other embodiments, the light-shielding patterns 122 may also be disposed in the substrate 110 to form a black matrix on array (BOA) structure. In addition, the invention is not intent to limit that the light-shielding patterns 122 have to be black matrices, and in other embodiments, the disposition of the black matrices may also be omitted. Specifically, in another embodiment of the invention, adjacent color filter patterns may be partially stacked with each other, and a plurality of portions of the stacked color filter patterns may be employed as the light-shielding patterns 122 for functionally substituting for the black matrices. Moreover, the invention is also not intent to limit positions of the color filter patterns 124 or whether the color filter patterns 124 are disposed. For example, in yet another embodiment of the invention, the color filter patterns 124 are also integrated in the pixel array substrate (i.e., the substrate 110) to form a color filter on array (COA) structure. In still another embodiment of the invention, if the touch display apparatus 1000 is not required to display color images, or the display medium 130 (e.g., the OLED) is capable of emitting color lights, the color filter patterns 124 may also selectively be not disposed.

The substrate 110 and the substrate 120 have an inner surface 110a and an inner surface 120a facing the display medium 130 and an outer surface 110b and an outer surface 120b with the backs facing the display medium 130. In the present embodiment, the touch electrodes 200 may be directly disposed on the outer surface 120b of the substrate 120 of the display panel 100, thereby forming an on-cell structure. In the present embodiment, the display panel 100 may also selectively include two polarizers 142 and 144. The polarizer 142 is disposed on the outer surface 110b of the substrate 110, and the polarizer 144 is disposed on the outer surface 120b of the substrate 120. The polarizer 144 covers the touch electrodes 200 to protect the touch electrodes 200. In other words, the polarizer 144 may be employed as a protection film. In the present embodiment, a haze of the polarizer 144 may be H, and 0%≤H≤50%, but the invention is not limited thereto Additionally, in the present embodiment, the touch display apparatus 1000 further includes a protection substrate 300. A material of the protection substrate 300 is, for example, glass, and the protection substrate 300 may be disposed above the polarizer 144 and bonded with the polarizer 144 through an optical adhesive 400. However, the invention is not limited thereto, in other embodiments, the touch electrodes 200 may also be disposed at other suitable positions. Embodiments will be provided below with other accompanying drawings for description.

Figure 2:
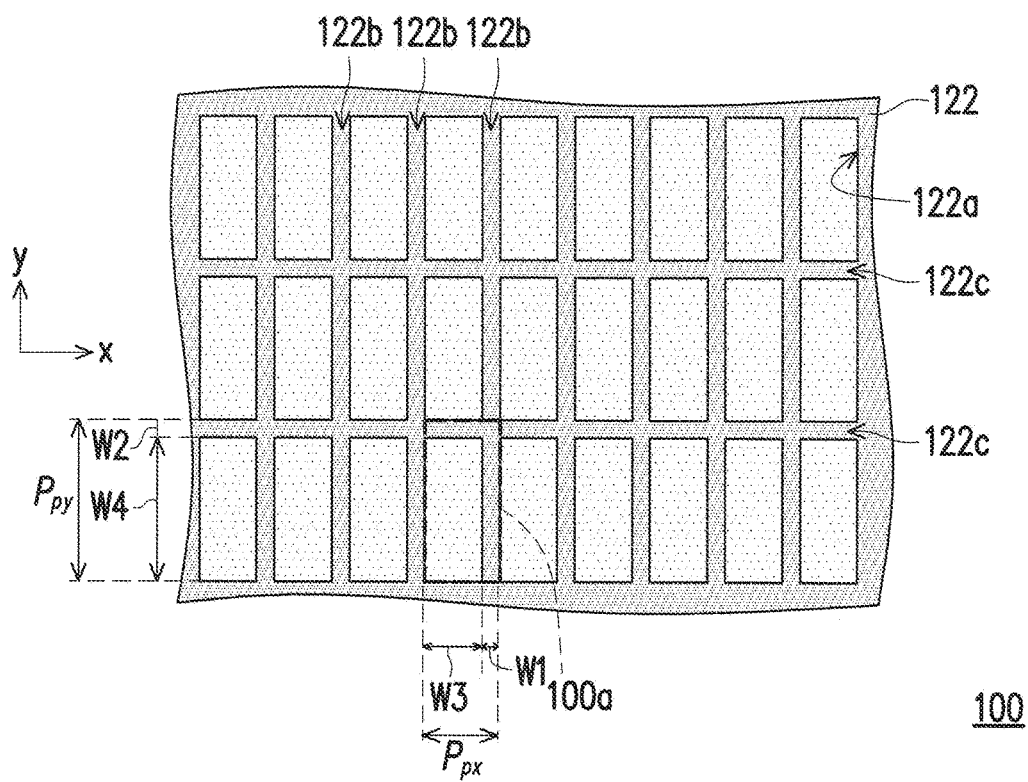
FIG. 2 is a schematic top view showing the display panel according to an embodiment of the invention.

FIG. 2 is a schematic top view showing the display panel according to an embodiment of the invention. Referring to FIG. 2, the display panel 100 has a plurality of pixel areas 100a arranged in an array. In the present embodiment, each of the pixel areas 100a may be considered as a sub-pixel having its own color, and a plurality of sub-pixels may form a pixel. For example, each pixel may include three pixel areas 100a respectively having a red color, a green color and a blue color. However, the invention is not limited thereto, both the number of the pixel areas 100a of each pixel and the colors of the pixel areas may be determined based on actual demands, for example, four pixel areas 100a respectively having a white color, a red color, a green color and a blue color, or alternatively, four pixel areas 100a respectively having a yellow color, a red color, a green color and a blue color.

Referring to FIG. 2, the pixel areas 100a are arranged with a pixel pitch $P_{px}$ in a first direction x. The pixel areas 100a are arranged with a pixel pitch $P_{py}$ in a second direction y. The first direction x intersects the second direction y. In the present embodiment, the first direction x and the second direction y may be perpendicular to each other, but the invention is not limited thereto The light-shielding patterns 122 include a plurality of first light-shielding portions 122b and a plurality of second light-shielding portions 122c. The first light-shielding portions 122b intersect the second light-shielding portions 122c, thereby defining a plurality of light-transmitting areas 122a. Each of the first light-shielding portions 122b has a width W1 in the first direction x. Each of the second light-shielding portions 122c has a width W2 in the second direction y. Each of the light-transmitting areas 122a has a width W3 in the first direction x. Each of the light-transmitting areas 122a has a width W4 in the second direction y. In the present embodiment, the pixel pitch $P_{px}$ may refer to a sum of the width W1 of one first light-shielding portion 122b and the width W3 of one light-transmitting area 122a. The pixel pitch $P_{py}$ may refer to a sum of the width W2 of one second light-shielding portion 122c and the width W4 of one light-transmitting area 122a. However, the invention is not limited thereto, and in other embodiments, the pixel pitch $P_{px}$ may also be defined by a distance between a center of each of the light-transmitting areas 122a and a center of another light-transmitting area 122a adjacent thereto in the first direction x, and the pixel pitch $P_{py}$ may also be defined by a distance between a center of each of the light-transmitting areas 122a and a center of another light-transmitting area 122a adjacent thereto in the second direction y. Generally, $2.7P_{px} \leq P_{py} \leq 3.3P_{px}$, which is preferably designed as $P_{py}=3P_{px}$, but the invention is also not limited thereto.

Figure 3:
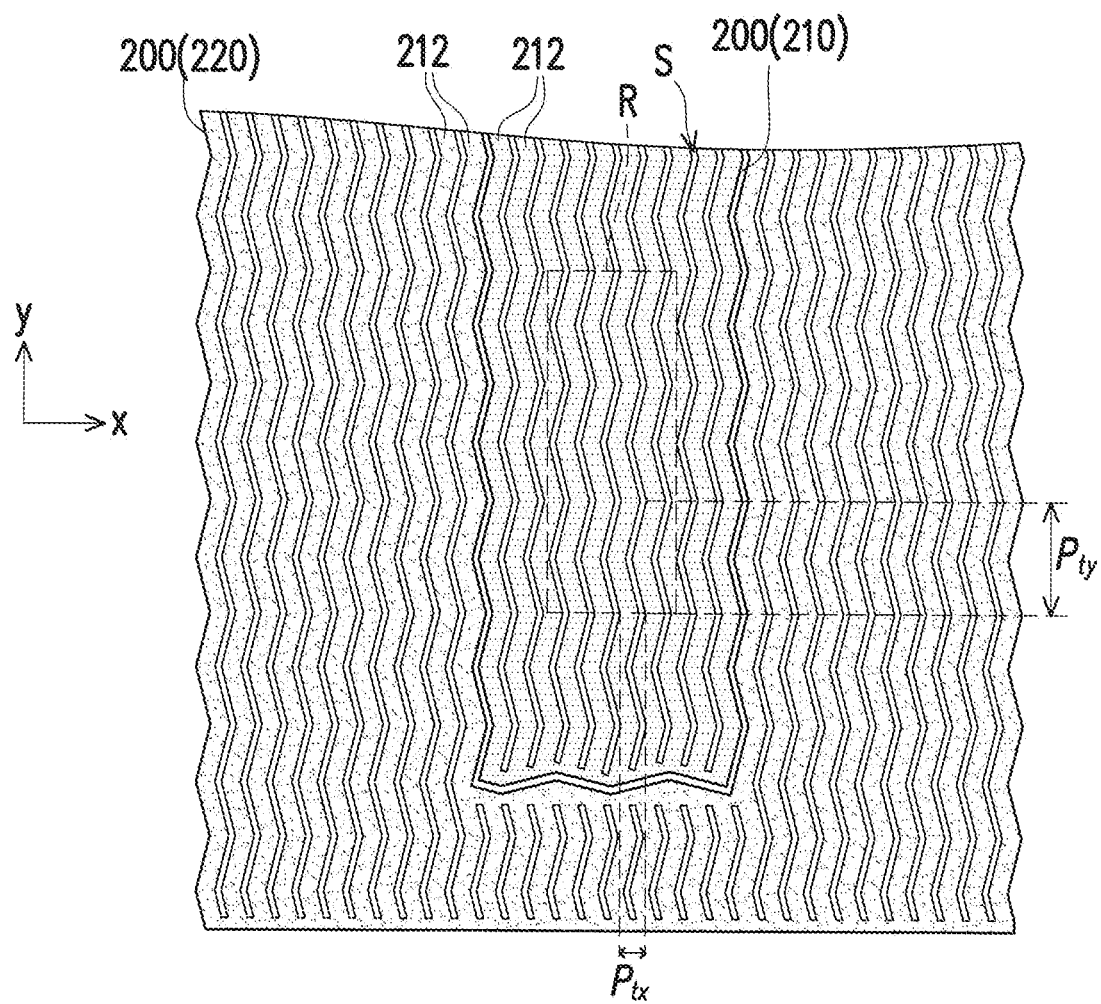
FIG. 3 is a schematic top view showing the touch electrodes according to an embodiment of the invention.

FIG. 3 is a schematic top view showing the touch electrodes according to an embodiment of the invention. In the present embodiment, the touch electrodes 200 include first touch electrodes 210 and second touch electrodes 220 which are electrically separated from each other. In addition, a reference electrode or a ground electrode (which is not shown) may also be included between each adjacent first touch electrode 210 and second touch electrode 220, and an electric potential may be input to the reference electrode to reduce noise interference. One of the first touch electrode 210 and the second touch electrode 220 is a driving electrode. The other one of the first touch electrode 210 and the second touch electrode 220 is a receiving electrode. The driving electrode outputs a touch scan signal, the receiving electrode receives a voltage signal obtained by sensing capacitance coupling, and thereby, a touched position may be determined according to a change of the voltage signal. In the present embodiment, the first touch electrodes 210 and the second touch electrodes 220 may be formed on the same layer, but the invention is not limited thereto The capacitance sensing mode of the present embodiment is mutual-capacitance sensing. A pattern design of the first touch electrodes 210 and the second touch electrodes 220 may be a 1-transmitter and multiple-receiver (1TMR) architecture, a 1-transmitter and 2-receiver (1T2R) architecture, a 1-transmitter and 3-receiver (1T3R) architecture or other suitable architectures. For example, the 1T2R architecture refers to an architecture in which one first touch electrode 210 corresponds to two second touch electrodes 220, and after a driving signal is provided to the first touch electrode 210, the corresponding two second touch electrodes 220 respectively output sensing signals to an integrated circuit for signal processing. The 1T3R architecture refers to an architecture in which one first touch electrode 210 corresponds to three second touch electrodes 220. In other embodiments, the capacitance sensing mode may be self-capacitance sensing, and in this case, the first touch electrodes 210 and the second touch electrodes 220 themselves serve as driving electrodes and also receiving electrodes.

Figure 4:
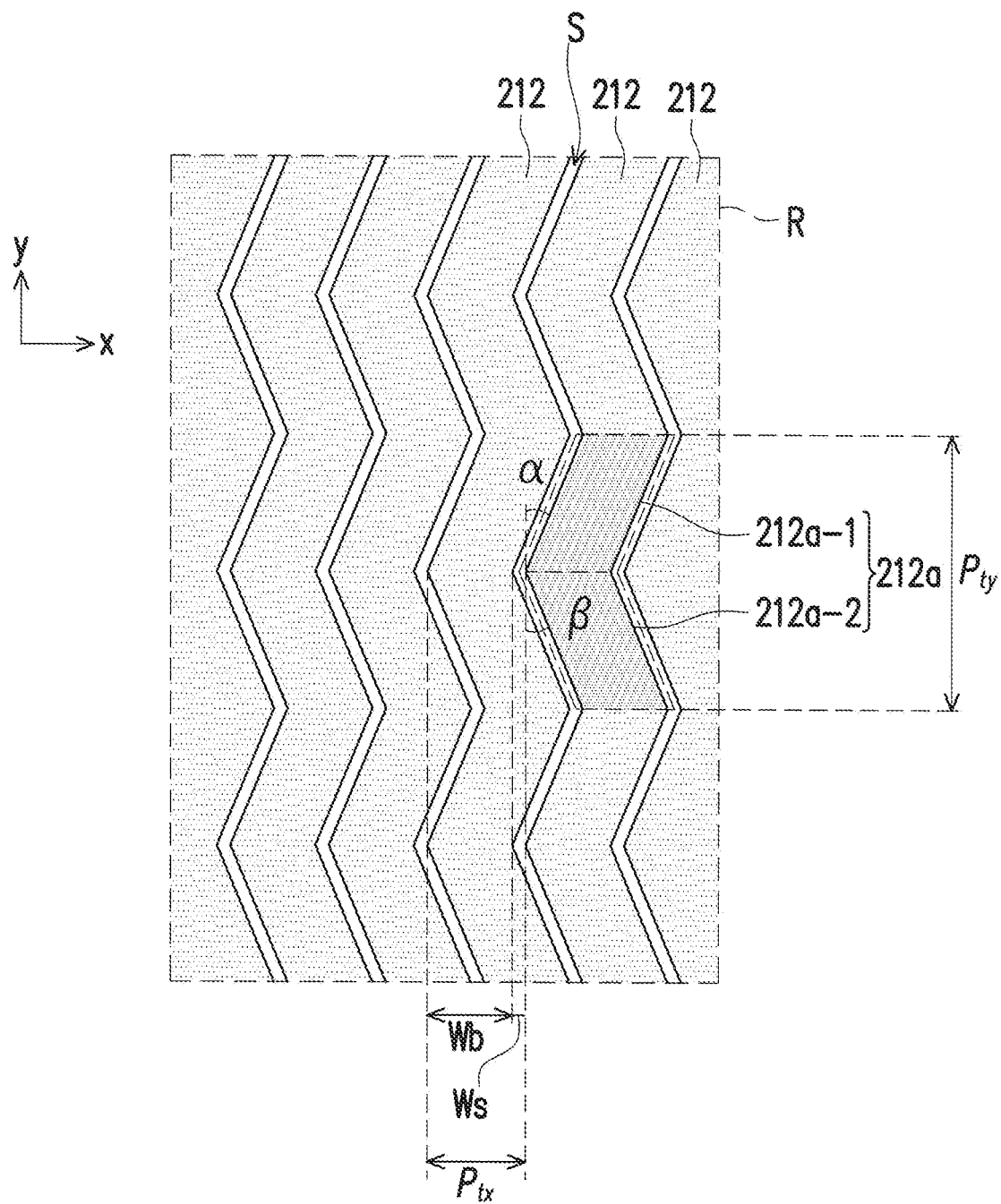
FIG. 4 is a schematic enlarged view showing the partial touch electrodes according to an embodiment of the invention.

FIG. 4 is a schematic enlarged view showing the partial touch electrodes according to an embodiment of the invention. Particularly, FIG. 4 corresponds to an area R in FIG. 3. Referring to FIG. 3 and FIG. 4, each of the touch electrodes 200 has a plurality of bending patterns 212. A reference electrode or a ground electrode (which is not shown) may also be included between each adjacent touch electrodes 200, and the ground electrode may also have a plurality of bending patterns 212. In the present embodiment, each of the bending patterns 212 may present a profile of jagged shape. The bending patterns 212 of the touch electrodes 200 are arranged with a first touch electrode pitch $P_{tx}$ in the first direction x. As shown in FIG. 4, in the present embodiment, the first touch electrode pitch $P_{tx}$ may refer to a distance from a bending point of one bending pattern 212 to a bending point of another adjacent bending pattern 212 adjacent thereto in the first direction x. Each of the bending patterns 212 has a width Wb in the first direction x. A spacing S is between each two adjacent bending patterns 212. The spacing S has a width Ws in the first direction x. In the present embodiment, the first touch electrode pitch $P_{tx}$ may be a sum of the width Wb of one bending pattern 212 and the width Ws of one spacing S. In other embodiments, each of the bending patterns 212 may also present a wavy shape.

Referring to FIG. 4, each of the bending patterns 212 includes a plurality of repeating portions 212a connected with one another, and for descriptive convenience, one of the repeating portion 212a is represented by an area filled with relatively dense dots. The repeating portions 212a are arranged with a second touch electrode pitch $P_{ty}$ in the second direction y. A width of the second touch electrode pitch $P_{ty}$ and a width of one repeating portion 212a in the second direction y may be the same. Each of the repeating portions 212a has a first line segment 212a-1 inclined with respect to the first direction x and the second direction y. An angle α is included between the first line segment 212a-1 and the second direction y, and 10°≤α≤45°. In the present embodiment, each of the repeating portions 212a further has a second line segment 212a-2 inclined with respect to the first direction x and the second direction y. A direction of the second line segment 212a-2 is different from a direction of the first line segment 212a-1. In the present embodiment, the first line segment 212a-1 is connected with the second line segment 212a-2, thereby forming one dogleg-shaped repeating portion 212a, but the invention is not limited thereto. In an embodiment, each of the repeating portions 212a may also be a wavy shape. An angle β is included between the second line segment 212a-2 and the second direction y, and in the present embodiment, 10°≤β≤45°. The angle α may be equal to the angle β, but the invention is not limited thereto, and in other embodiments, the angle α may be different from the angle β. In another embodiment, a plurality of angles α and a plurality of angles β may also be included between the first line segment 212a-1 and the second direction y and between the second line segment 212a-2 and the second direction y. For example, when the repeating portions 212a present the wavy shape, the first line segment 212a-1 and the second line segment 212a-2 are curved lines, and as the position of the second direction y changes, the angles α and β included with the second direction y are gradually changed, i.e., the angles α and β are not constant values. Additionally, in the present embodiment, a length of the first line segment 212a-1 may be the same as a length of the second line segment 212a-2. However, the invention is not limited thereto, in other embodiments, the lengths of the first line segment 212a-1 and the second line segment 212a-2 may also be different. It should be noted that ideally, each of the bending patterns 212 may have the repeating portions 212a in an integer multiple, but actually, each of the bending patterns 212 may have the repeating portions 212a in a non-integer multiple. Additionally, in one of the bending patterns 212, the repeating portions 212a may also be not connected with one another.

Referring to FIG. 2 to FIG. 4, the angle α is included between the first line segment 212a-1 of each of the bending patterns 212 of the touch electrodes 220 and the second direction y, 10°≤α≤45°, and the first touch electrode pitch $P_{tx}$ and the second touch electrode pitch $P_{ty}$ of each of the bending patterns 212 are set to satisfy conditions of formulas (1) and (2) as below, so as to construct the touch electrodes 200 of the embodiment. Moreover, a size (i.e., the pixel pitch $P_{px}$) of each of the pixel areas 100a is set to satisfy the conditions of the following formulas (1) and (2), so as to construct the display panel 100 of the embodiment. The touch display apparatus 1000 of the embodiment is constructed by overlapping the touch electrodes 200 and the display panel 100. For the touch display apparatus 1000 of the embodiment, a visual sense evaluation is taken to evaluate the generated moire patterns. The results show that when 10°≤α≤45°, and the following formulas (1) and (2) are satisfied, the generation of the moire patterns may be properly suppressed.

$$1.5P_{px} \le P_{tx} \le 2P_{px} \quad \text{Formula (1)}$$

$$1.63P_{px} \le 0.5P_{ty} \le 9.94P_{px} \quad \text{Formula (2)}$$

To be more detailed, when 10°≤α≤15°, and the pixel pitch $P_{px}$, the first touch electrode pitch $P_{tx}$ and the second touch electrode pitch $P_{ty}$ satisfy: $1.5P_{px} \le P_{tx} \le 2P_{px}$ and $6.51P_{px} \le 0.5P_{ty} \le 9.94P_{px}$, the generation of the moire patterns may be properly suppressed. When 15°≤α≤20°, and the pixel pitch $P_{px}$, the first touch electrode pitch $P_{tx}$ and the second touch electrode pitch $P_{ty}$ satisfy: $1.5P_{px} \le P_{tx} \le 2P_{px}$ and $4.76P_{px} \le 0.5P_{ty} \le 6.51P_{px}$, the generation of the moire patterns may be properly suppressed. When 20°≤α≤25°, and the pixel pitch $P_{px}$, the first touch electrode pitch $P_{tx}$ and the second touch electrode pitch $P_{ty}$ satisfy: $1.5P_{px} \le P_{tx} \le 2P_{px}$ and $3.68P_{px} \le 0.5P_{ty} \le 4.76P_{px}$, the generation of the moire patterns may be properly suppressed. When 25°≤α≤30°, and the pixel pitch $P_{px}$, the first touch electrode pitch $P_{tx}$ and the second touch electrode pitch $P_{ty}$ satisfy: $1.5P_{px} \le P_{tx} \le 2P_{px}$ and $2.94P_{px} \le 0.5P_{ty} \le 3.68P_{px}$, the generation of the moire patterns may be properly suppressed. When 30°≤α≤35°, and the pixel pitch $P_{px}$, the first touch electrode pitch $P_{tx}$ and the second touch electrode pitch $P_{ty}$ satisfy: $1.5P_{px} \le P_{tx} \le 2P_{px}$ and $2.4P_{px} \le 0.5P_{ty} \le 2.94P_{px}$, the generation of the moire patterns may be properly suppressed. When 35°≤α≤40°, and the pixel pitch $P_{px}$, the first touch electrode pitch $P_{tx}$ and the second touch electrode pitch $P_{ty}$ satisfy: $1.5P_{px} \le P_{tx} \le 2P_{px}$ and $1.97P_{px} \le 0.5P_{ty} \le 2.4P_{px}$, the generation of the moire patterns may be properly suppressed. When 40°≤α≤45°, and the pixel pitch $P_{px}$, the first touch electrode pitch $P_{tx}$ and the second touch electrode pitch $P_{ty}$ satisfy: $1.5P_{px} \le P_{tx} \le 2P_{px}$ and $1.63P_{px} \le 0.5P_{ty} \le 1.97P_{px}$, the generation of the moire patterns may be properly suppressed.

Figure 5:
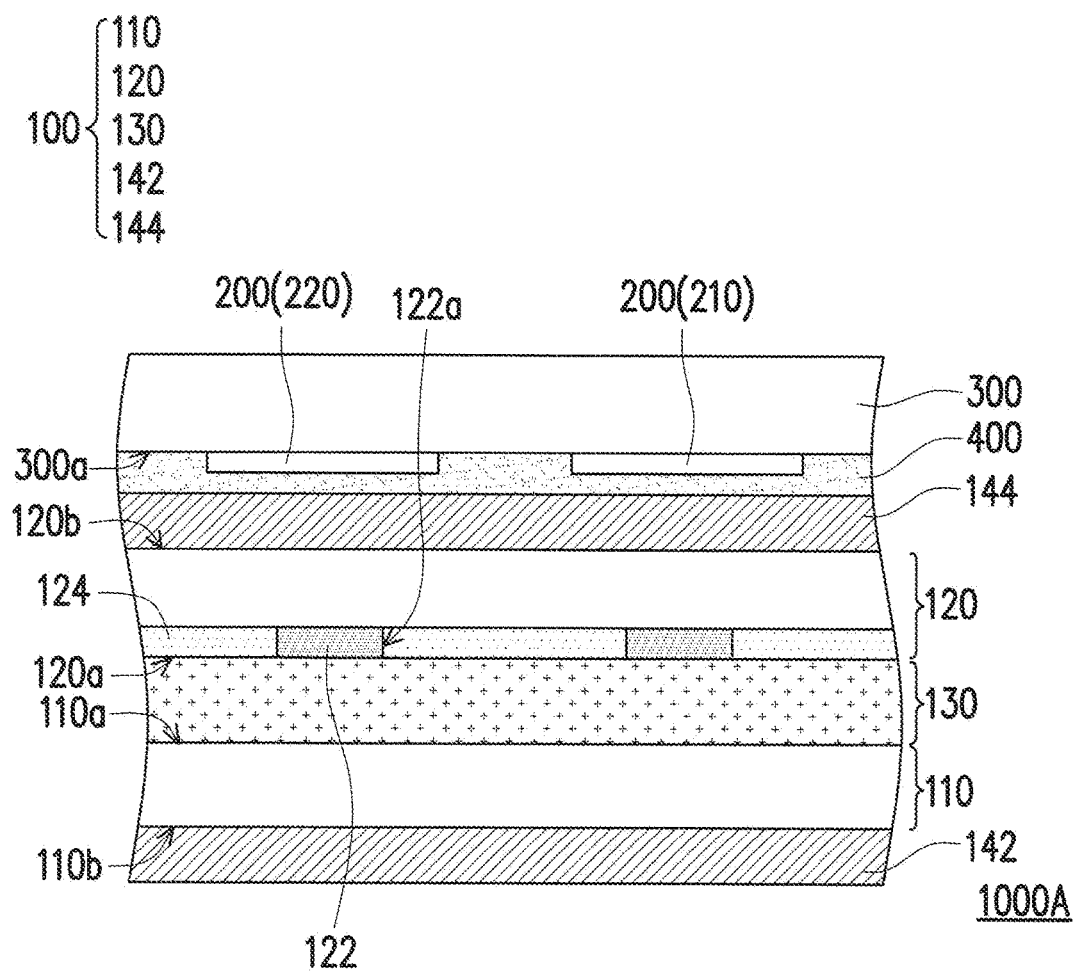
FIG. 5 is a schematic cross-sectional view showing a touch display apparatus according to another embodiment of the invention.

FIG. 5 is a schematic cross-sectional view showing a touch display apparatus according to another embodiment of the invention. A touch display apparatus 1000A illustrated in FIG. 5 is similar to the touch display apparatus 1000 illustrated in FIG. 1, and thus, the same or similar elements are represented by using the same or similar referral numerals. Referring to FIG. 5, the touch display apparatus 1000A includes the display panel 100 and the touch electrodes 200 disposed above the display panel 100. The difference between the touch display apparatus 1000A and the touch display apparatus 1000 is that the touch electrodes 200 of the touch display apparatus 1000A are disposed on an inner surface 300a of the protection substrate 300, while the touch electrodes 200 of the touch display apparatus 1000 are directly disposed on the outer surface 120b of the substrate 120 of the display panel 100. In other words, the touch display apparatus 1000A has a one glass solution (OGS) structure. The patterns of the touch electrodes 200 of the touch display apparatus 1000A are the same as the patterns of the touch electrodes 200 of the touch display apparatus 1000. The pixel areas 100a of the display panel 100 of the touch display apparatus 1000A are the same as the pixel areas 100a of the display panel 100 of the touch display apparatus 100. Therefore, the angle α, the angle β, the first touch electrode pitch $P_{tx}$ and the second touch electrode pitch $P_{ty}$ of the touch electrodes 200 of the touch display apparatus 1000A, the pixel $P_{px}$ of the display panel 100 of the touch display apparatus 1000A and a relation therebetween may refer to the description set forth above and will not be repeated.

Figure 6:
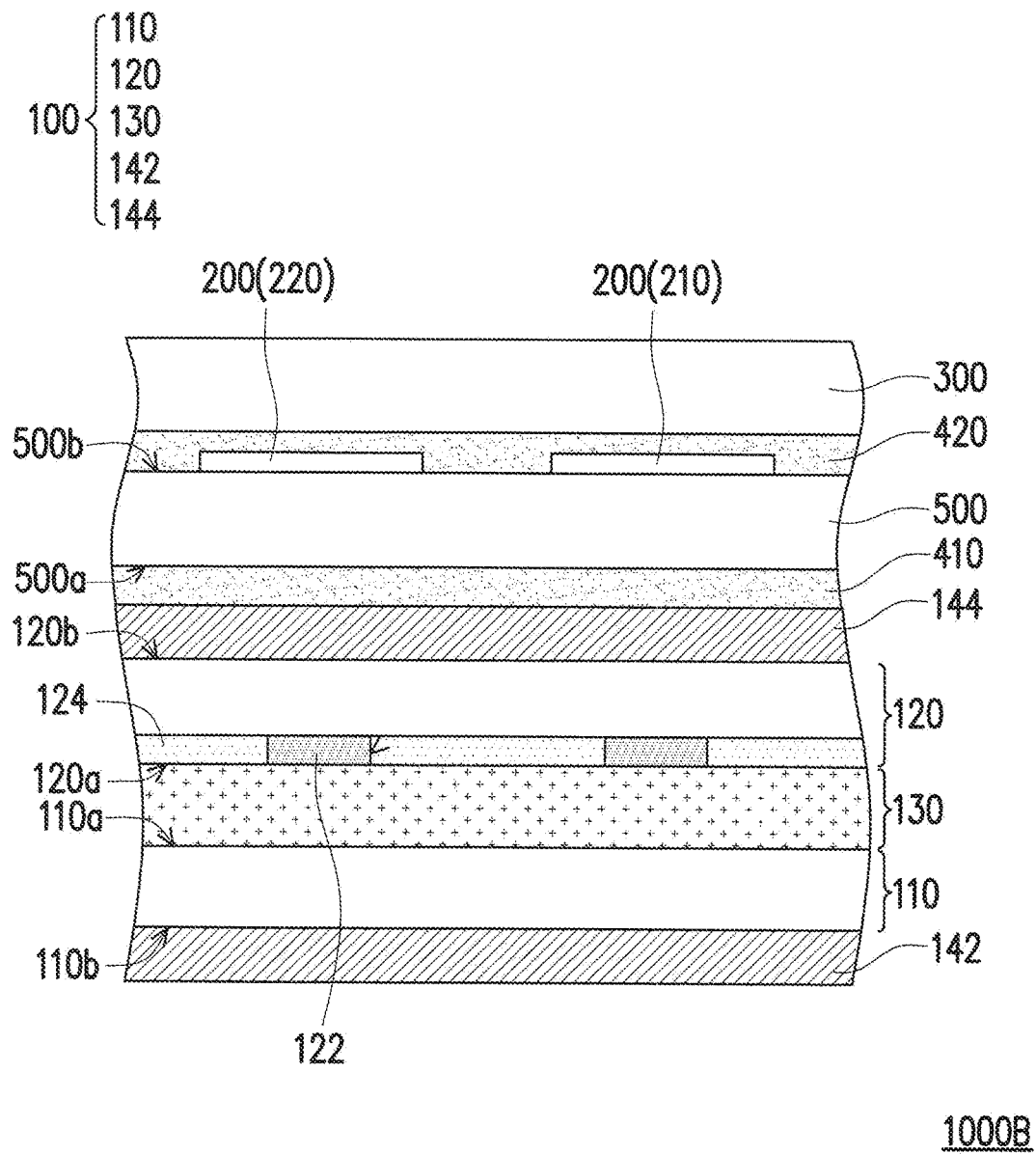
FIG. 6 is a schematic cross-sectional view showing a touch display apparatus according to another embodiment of the invention.

FIG. 6 is a schematic cross-sectional view showing a touch display apparatus according to another embodiment of the invention. A touch display apparatus 1000B illustrated in FIG. 6 is similar to the touch display apparatus 1000 illustrated in FIG. 1, and thus, the same or similar elements are represented by using the same or similar referral numerals. Referring to FIG. 6, the touch display apparatus 1000B includes the display panel 100 and the touch electrodes 200 disposed above the display panel 100. The difference between the touch display apparatus 1000B and the touch display apparatus 1000 is that the touch display apparatus 1000B further having a sensor substrate 500 which is disposed above the polarizer 144 and bonded with the polarizer 144 through an optical adhesive 410, and the touch electrodes 200 are disposed on a top surface 500b of the sensor substrate 500, while the touch electrodes 200 of the touch display apparatus 1000 are directly disposed on the outer surface 120b of the substrate 120 of the display panel 100. However, the invention is not limited thereto, the touch electrodes 200 may also be disposed on a bottom surface 500a of the sensor substrate 500, or alternatively, disposed on both the bottom surface 500a and the top surface 500b of the sensor substrate 500. The protection substrate 300 is disposed above the sensor substrate 500 and bonded with the sensor substrate 500 through an optical adhesive 420. The protection substrate 300 and the sensor substrate 500 may be made of glass. In other words, the touch display apparatus 1000B has a cover glass/sensor glass (G/G type) structure. However, the invention is not limited thereto, and in an embodiment, the sensor substrate 500 may also be made of a plastic film (ex. PET). The patterns of the touch electrodes 200 of the touch display apparatus 1000B are the same as the patterns of the touch electrodes 200 of the touch display apparatus 1000. The pixel areas 100a of the display panel 100 of the touch display apparatus 1000B are the same as the pixel areas 100a of the display panel 100 of the touch display apparatus 100. Thus, the angle α, the angle β, the first touch electrode pitch $P_{tx}$ and the second touch electrode pitch $P_{ty}$ of the touch electrodes 200 of the touch display apparatus 1000B, the pixel $P_{px}$ of the display panel 100 of the touch display apparatus 1000B and a relation therebetween may refer to the description set forth above and will not be repeated.

In light of the foregoing, the touch display apparatus according to an embodiment of the invention includes display panel having the pixel areas and the touch electrodes disposed above the display panel. The pixel areas are arranged with the pixel pitch $P_{px}$ in the first direction. The bending patterns of the touch electrodes are arranged with the first touch electrode pitch $P_{tx}$ in the first direction. Each of the bending patterns includes the repeating portions connected with one other. The repeating portions are arranged with the second touch electrode pitch $P_{ty}$ in the second direction intersecting the first direction. Each of the repeating portions has the first line segment inclined with the first direction and the second direction, and the angle α is included between the first line segment and the second direction, wherein $10° \leq α \leq 45°$. The pixel pitch $P_{px}$, the first touch electrode pitch $P_{tx}$ and the second touch electrode pitch $P_{ty}$ satisfy: $1.5P_{px} \leq P_{tx} \leq 2P_{px}$ and $1.63P_{px} \leq 0.5P_{ty} \leq 9.94P_{px}$. Thereby, the generation of the moire patterns may be properly suppressed, so as to improve the quality of the touch display apparatus.

Although the invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:

1. A touch display apparatus, comprising:
   a display panel, having a plurality of pixel areas, the pixel areas being arranged with a pixel pitch $P_{px}$ in a first direction; and
   a plurality of touch electrodes, disposed above the display panel, each of the touch electrodes having a plurality of bending patterns, the bending patterns of the touch electrodes being arranged with a first touch electrode pitch $P_{tx}$ in the first direction, each of the bending patterns comprising a plurality of repeating portions connected with one another, the repeating portions being arranged with a second touch electrode pitch $P_{ty}$ in a second direction intersecting the first direction, each of the repeating portions has a first line segment inclined with respect to the first direction and the second direction, and an angle α being included between the first line segment and the second direction, wherein $10° \leq α \leq 45°$, and the pixel pitch $P_{px}$, the first touch electrode pitch $P_{tx}$ and the second touch electrode pitch $P_{ty}$ satisfy:
   $1.5P_{px} \leq P_{tx} \leq 2P_{px}$ and $1.63P_{px} \leq 0.5P_{ty} \leq 9.94P_{px}$.

2. The touch display apparatus according to claim 1, wherein $10° \leq α \leq 15°$, and the pixel pitch $P_{px}$, the first touch electrode pitch $P_{tx}$ and the second touch electrode pitch $P_{ty}$ satisfy:
   $1.5P_{px} \leq P_{tx} \leq 2P_{px}$ and $6.51P_{px} \leq 0.5P_{ty} \leq 9.94P_{px}$.

3. The touch display apparatus according to claim 1, wherein $15° \leq α \leq 20°$, and the pixel pitch $P_{px}$, the first touch electrode pitch $P_{tx}$ and the second touch electrode pitch $P_{ty}$ satisfy:
   $1.5P_{px} \leq P_{tx} \leq 2P_{px}$ and $4.76P_{px} \leq 0.5P_{ty} \leq 6.51P_{px}$.

4. The touch display apparatus according to claim 1, wherein $20° \leq α \leq 25°$, and the pixel pitch $P_{px}$, the first touch electrode pitch $P_{tx}$ and the second touch electrode pitch $P_{ty}$ satisfy:
   $1.5P_{px} \leq P_{tx} \leq 2P_{px}$ and $3.68P_{px} \leq 0.5P_{ty} \leq 4.76P_{px}$.

5. The touch display apparatus according to claim 1, wherein $25° \leq α \leq 30°$, and the pixel pitch $P_{px}$, the first touch electrode pitch $P_{tx}$ and the second touch electrode pitch $P_{ty}$ satisfy:
   $1.5P_{px} \leq P_{tx} \leq 2P_{px}$ and $2.94P_{px} \leq 0.5P_{ty} \leq 3.68P_{px}$.

6. The touch display apparatus according to claim 1, wherein $30° \leq α \leq 35°$, and the pixel pitch $P_{px}$, the first touch electrode pitch $P_{tx}$ and the second touch electrode pitch $P_{ty}$ satisfy:

$1.5P_{px} \leq P_{tx} \leq 2P_{px}$ and $2.4P_{px} \leq 0.5P_{ty} \leq 2.95P_{px}$.

7. The touch display apparatus according to claim 1, wherein $35° \leq \alpha \leq 40°$, and the pixel pitch $P_{px}$, the first touch electrode pitch $P_{tx}$ and the second touch electrode pitch $P_{ty}$ satisfy:

$1.5P_{px} \leq P_{tx} \leq 2P_{px}$ and $1.97P_{px} \leq 0.5P_{ty} \leq 2.4P_{px}$.

8. The touch display apparatus according to claim 1, wherein $40° \leq \alpha \leq 45°$, and the pixel pitch $P_{px}$, the first touch electrode pitch $P_{tx}$ and the second touch electrode pitch $P_{ty}$ satisfy:

$1.5P_{px} \leq P_{tx} \leq 2P_{px}$ and $1.63P_{px} \leq 0.5P_{ty} \leq 1.97P_{px}$.

9. The touch display apparatus according to claim 1, wherein each of the bending patterns presents a profile of jagged shape.

10. The touch display apparatus according to claim 1, wherein each of the repeating portions further has a second line segment inclined with respect to the first direction and the second direction, and a direction of the second line segment is different from a direction of the first line segment.

11. The touch display apparatus according to claim 10, wherein a length of the first line segment is the same as a length of the second line segment.

12. The touch display apparatus according to claim 10, wherein an angle β is included between the second line segment and the second direction, and β=α.

13. The touch display apparatus according to claim 10, wherein an angle β is included between the second line segment and the second direction, wherein $10° \leq \beta \leq 45°$.

14. The touch display apparatus according to claim 10, wherein each of the repeating portions presents a profile of dogleg shape.

15. The touch display apparatus according to claim 1, wherein the touch electrodes are formed on the same layer.

16. The touch display apparatus according to claim 1, further comprising:
a protection film, covering the touch electrodes.

17. The touch display apparatus according to claim 16, wherein a haze of the protection film is H, and $0\% \leq H \leq 50\%$.

18. The touch display apparatus according to claim 16, wherein the display panel comprises:
two substrates opposite to each other;
a display medium located between the two substrates; and
two polarizers, wherein each of the substrates has an outer surface away the display medium, the two polarizers are respectively disposed on outer surfaces of the two substrates, and the protection film is one of the two polarizers.

19. The touch display apparatus according to claim 1, wherein the display panel comprises two substrates opposite to each other and a display medium located between the two substrates, each of the substrates has an outer surface away the display medium, and the touch electrodes are directly disposed on the outer surface of one of the substrates.

20. The touch display apparatus according to claim 1, further comprising:
a protection substrate, disposed above the display panel and having an inner surface facing the display panel, and the touch electrodes being disposed on the inner surface of the protection substrate.

21. The touch display apparatus according to claim 1, further comprising:
a sensor substrate, disposed above the display panel and having a top surface and a bottom surface, and the touch electrodes being disposed on at least one of the top surface and the bottom surface of the sensor substrate.

22. The touch display apparatus according to claim 1, wherein a touch sensing mode of the touch display apparatus is capacitance sensing.

23. The touch display apparatus according to claim 1, wherein the display panel is a liquid crystal display panel or an organic light-emitting diode (OLED) display panel.

* * * * *